Nov. 4, 1947.  G. WEST  2,430,263
METAL-WORKING TOOL
Filed March 20, 1944  3 Sheets-Sheet 1

Inventor
George West
BY
Carlson, Pitzner, Hubbard & Wolfe
Attorneys.

Nov. 4, 1947.    G. WEST    2,430,263
METAL-WORKING TOOL
Filed March 20, 1944    3 Sheets-Sheet 2
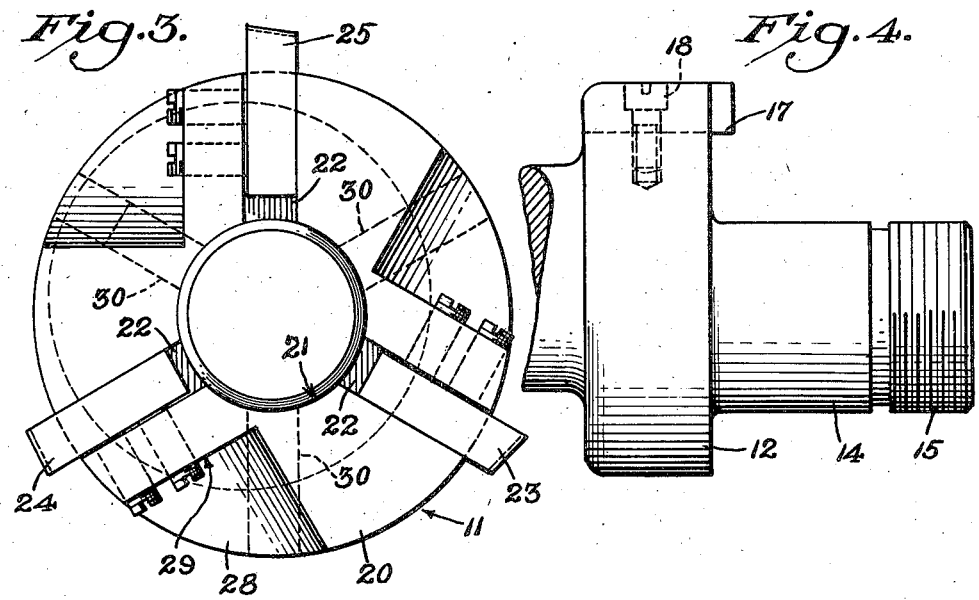
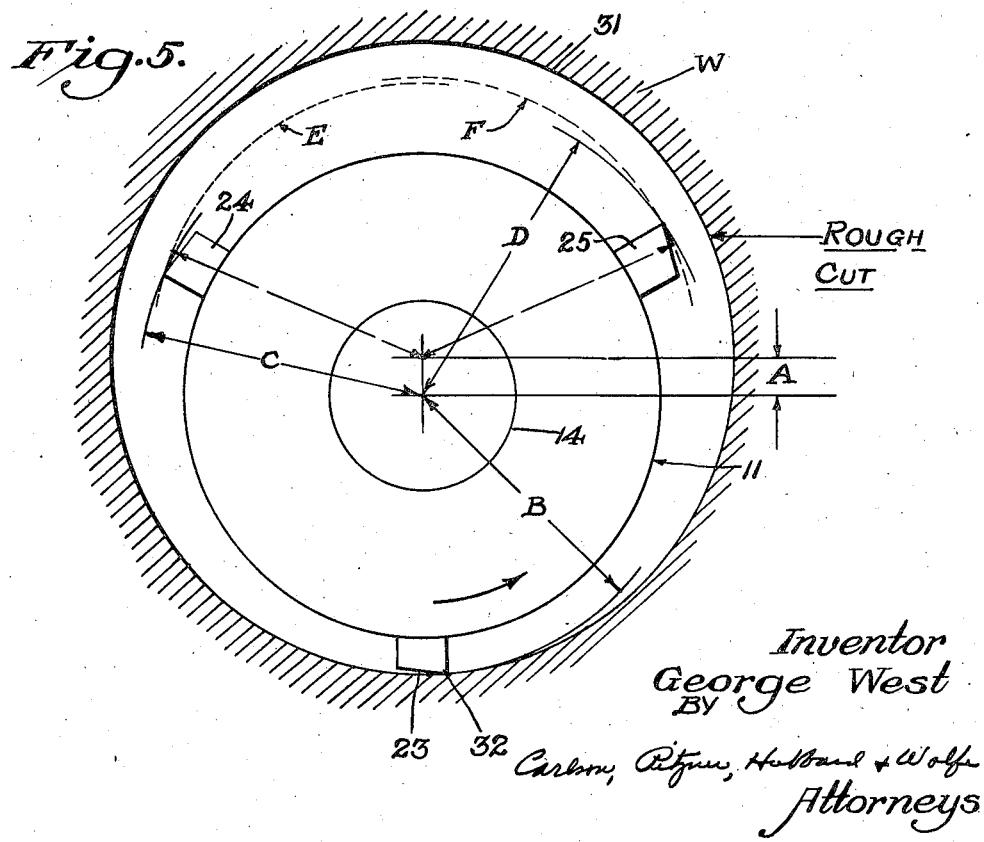
Inventor
George West
BY
Carlson, Pitzner, Hubbard & Wolfe
Attorneys Nov. 4, 1947.  G. WEST  2,430,263
METAL-WORKING TOOL
Filed March 20, 1944  3 Sheets-Sheet 3
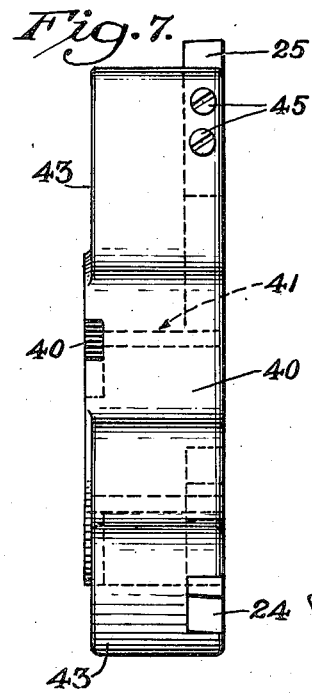
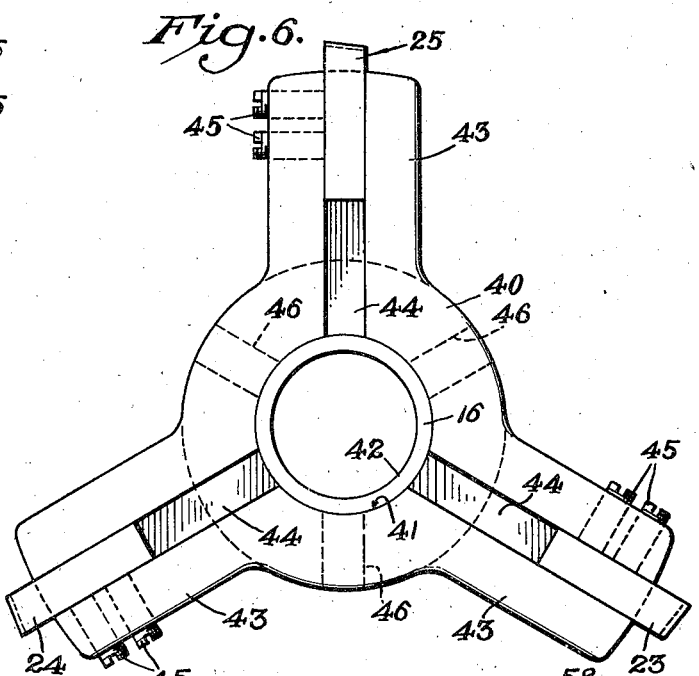
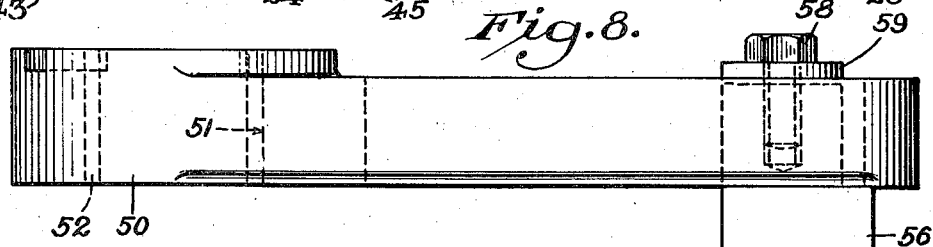
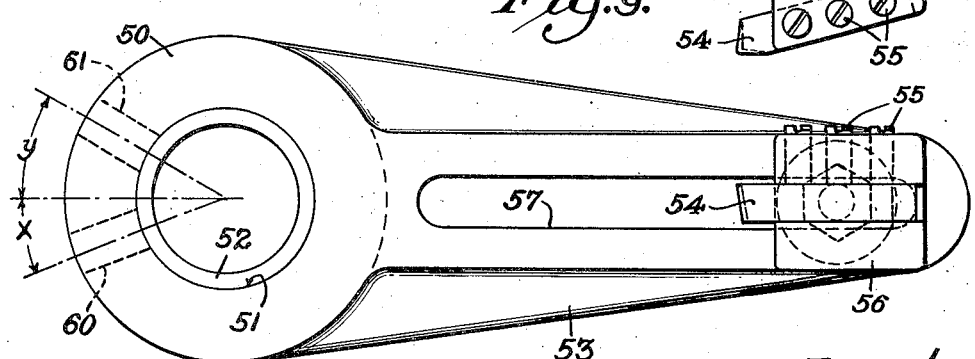
Inventor
George West
BY
Carlson, Pitzner, Hubbard & Wolfe
Attorneys.

Patented Nov. 4, 1947

2,430,263

UNITED STATES PATENT OFFICE 2,430,263

METAL-WORKING TOOL

George West, Kaukauna, Wis., assignor to Kaukauna Machine Corporation, Kaukauna, Wis., a corporation of Wisconsin Application March 20, 1944, Serial No. 527,182

3 Claims. (Cl. 77—58)

The invention relates generally to improvements in metal working tools, and more particularly to tools for performing boring and turning operations.

One object of the invention is to provide an improved tool of the above general character which greatly facilitates the performance of successive machining operations such as rough boring, semi-finish boring and finish boring.

Another object is to provide an improved tool having a plurality of cutters adapted to be accurately preset for the performance of a series of machining operations, and to be conditioned for operation singly and selectively as they are required without requiring a resetting of the cutters between operations.

A further object is to provide a metal working tool including a driver adapted to be attached to a rotatably driven machine tool spindle, and having a cutter support mounted thereon for relative adjustment, whereby the spacing of the cutter from the axis of the driver may be quickly and accurately changed for different machining operations.

It is also an object of the invention to provide a multiple cutter boring tool which is simple in construction, efficient in operation and very rugged and durable.

Other objects and advantages of the invention will become apparent from the following detailed description of the preferred embodiment illustrated in the accompanying drawings in which:

Fig. 3 is an end elevational view of the tool.

Fig. 4 is a fragmentary view of the driver element of the tool.

Fig. 5 is a diagrammatic view showing the relative positioning of the various cutters of the tool.

Fig. 6 is a front view of a modified form of cutter head.

Fig. 7 is a side view of the cutter head shown in Fig. 6.

Fig. 8 is a side view of another modified form of cutter head.

Fig. 9 is a front view of the cutter head shown in Fig. 8.

Figure 1:
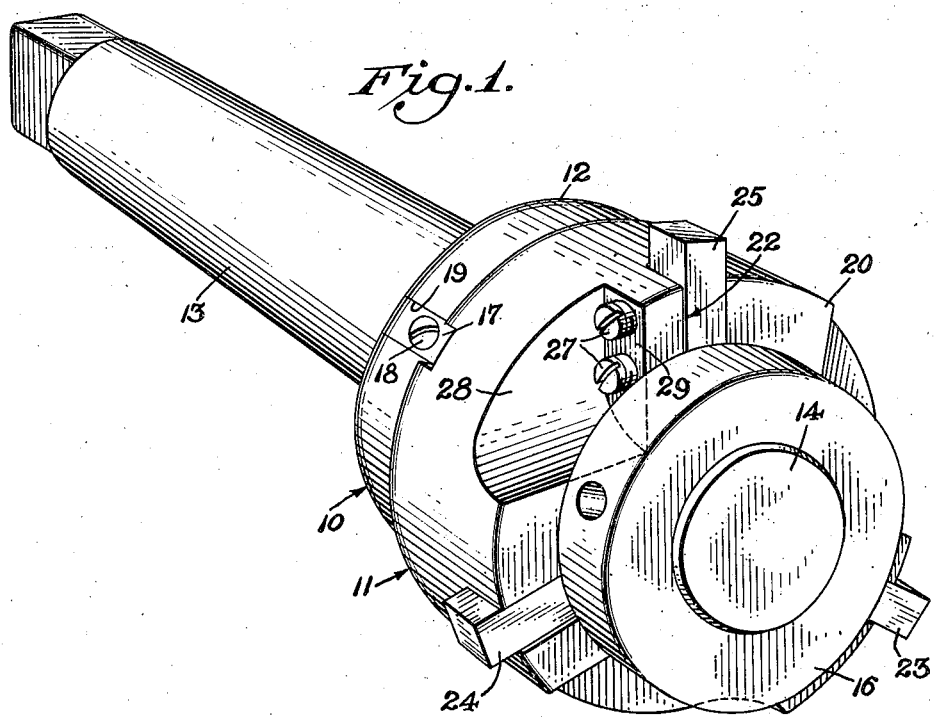
Fig. 1 is a perspective view of a boring tool embodying the features of the invention.

While I have shown in the drawings and will herein describe preferred forms of the improved tool, it is to be understood that I do not thereby intend to limit the invention to the particular forms illustrated but intend to cover all modifications, adaptations and alternative constructions falling within the spirit and scope of the invention as defined by the appended claims.

In carrying out the invention, I provide a driver 10 adapted to be attached to the rotatably driven spindle of a machine tool, and arranged to support adjustably a head 11 in which one or more cutters are rigidly mounted. By reason of the novel construction and arrangement of the driver and the head, the spacing of the cutter or cutters from the rotational axis of the driver may be quickly and accurately regulated by a simple adjustment of the head relative to the driver. Accordingly, the depth of cut taken by a single cutter may be adjusted as required and, where a plurality of cutters are employed, such cutters may be positioned singly and selectively for operation by the relative adjustment of the head and driver. Suitable means, such as cooperating projections and recesses are provided on the head and driver for selectively positioning and securing the head in such position of adjustment. Each of the cutters may therefore be accurately preset for a particular machining operation, and thereafter conditioned for operation as required without requiring any resetting of the same.

The driver 10, as herein shown, comprises a generally cylindrical body member 12 provided with means by which it may be drivingly connected to the machine tool spindle. In the exemplary tool, the connecting means is in the form of a tapered shank 13 dimensioned to fit the sockets commonly provided in the spindles of boring machines. It will be understood that connecting means suitable for use with the spindles of milling machines and other machine tools may be provided, if desired.

For supporting the cutter head 11, the member 12 is provided with a forwardly projecting pilot 14, herein shown as cylindrical. The pilot is arranged with its central axis substantially parallel to the rotational axis of the driver, but offset laterally or eccentric thereto as indicated at A in Fig. 5. The outer end of the pilot 14 is threaded as at 15 to receive a nut 16 (Figs. 1 and 2) for holding the head 11 securely in place thereon. The driver is provided, in this instance, with a projection, herein shown as a key 17 (Figs. 1, 2 and 4) anchored by a screw 18 in a slot 19 in the peripheral edge portion of the member 12 adapted to coact with suitable recesses or keyways in the head 11 to accurately locate the latter in selected angular positions with respect to the driver, and to secure the head against rotation relative to the driver when the tool is in use.

Figure 2:
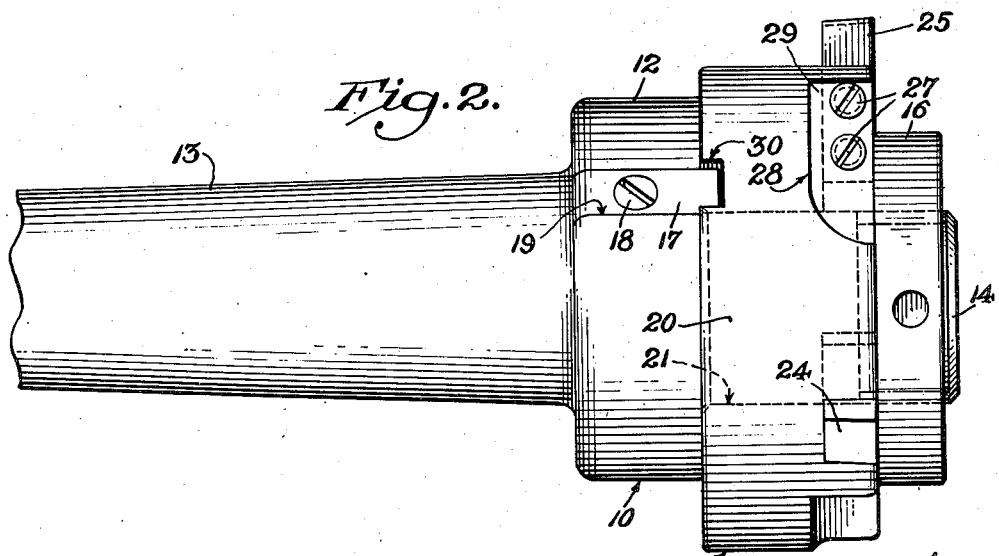
Fig. 2 is a side elevational view of the tool.

The head 11, in the form shown in Figs. 1–3, comprises a heavy metal ring 20 having a central bore 21 adapted to fit snugly over the pilot 14 of the driver. A plurality of radially disposed slots 22 in the outer face of the head 20 are adapted to receive suitable tool bits or cutters. In the exemplary tool, three slots 22, uniformly spaced apart around the head 11, are provided for holding respectively a roughing cutter 23, semi-finish cutter 24 and a finish cutter 25.

The cutters 23—25 are adapted to be rigidly locked in their respective slots by clamping screws 27 threaded into the head 11. To permit the use of relatively short screws 27 of uniform length, and to provide convenient access thereto, the head 20 preferably is formed in advance of the slots 22 with clearance recesses 28 defining exposed walls 29 of uniform width respectively along the front sides of the slots and through which the screws are threaded.

The rear face of the head 11 is formed with a plurality of keyways 30 adapted selectively to receive the key 17 carried by the tool body 12. To provide for the selective positioning of the cutters, one keyway 30 is provided for each cutter slot 22, the keyways being located in predetermined spaced relation to their respective slots.

The key 17 and keyways 30 are so located that engagement of the key in a selected keyway is effective to position the associated slot 22 substantially in alinement with the axes of the driver and the pilot 14 whereby the cutter is projected a maximum distance from the axes of the driver 10. In the preferred form of the tool as herein shown, the key 17 is located diametrically opposite the axis of the pilot 14 while the keyways 30 and their respective cutter slots are alined but disposed at diametrically opposite sides of the central axis of the head 11. Accordingly, when the key 17 is engaged in a selected keyway 30, the cutter slot 22 associated with such keyway is located at the point of maximum eccentricity relative to the head axis, and thereby projected radially in operative cutting position. Thus, when the tool is rotated about the axis of the driver 10, the selected cutter describes a greater circle of revolution than the other cutters carried by the head, and is thus conditioned for operation, while such other cutters are retracted into inactive position.

In the initial set-up of the tool, the cutters 23—25 may be accurately preset with respect to the head 11. In a typical set-up of the tool, as shown in Fig. 5, the cutters are set with their cutting edges spaced successively farther from the central axis of the head as indicated by the lines B, C and D for taking roughing, semi-finish and finish cuts respectively in the cored bore 31 of a workpiece W. With the roughing cutter 23 positioned for operation, as shown, rotation of the driver carries the cutting edge 32 of the cutter through a circular path having a radius equal to the distance B plus the off-set A of the pilot axis with respect to the axis of the driver 10. The cutters 24 and 25, on the other hand, are moved through circular paths E and F shown in broken lines in Fig. 5, which are smaller in diameter than the path of the cutter 23. The two latter cutters are therefore inactive, while cutter 23 performs its metal removing operation. It will be apparent that either cutter 24 or 25 may be conditioned for cutting operation by rotating the head 11 about the pilot 14 to locate the selected cutter in radial line with the axes of the driver and the pilot.

Figs. 6 and 7 illustrate a modified form of cutter head particularly suitable for machining relatively large work pieces. The head, in this instance, is spider shaped and comprises a generally cylindrical central or hub section 40 having an axial bore 41 fitted with a hardened steel liner or bushing 42 adapted to receive the pilot 14 of the driver. A plurality of rigid arms 43, preferably are integral with the hub 40 and project radially therefrom. The arms 43 are provided in their outer faces with radially disposed slots 44 for the reception of suitable cutters. The particular head shown is formed with three uniformly spaced arms 43 suitable for holding the same type of cutters as the head 11. These cutters 23 to 25 are rigidly locked in their respective slots 44 by clamping screws 45 threaded into the forward sides of the arms.

For selectively projecting the cutters into operative position, the section 40 of the head is formed on its rear face with a plurality of keyways 46 adapted individually to receive key 17 of the driver. As in the case of the head 11 previously described, the keyways 46 are alined with the cutter slots 44 of the respective arms, and are disposed on diametrically opposite sides of the axis of the head from such slots. Adjustment of the tool to condition any selected cutter for operation is effected in the manner heretofore described.

Figs. 8 and 9 illustrate another modified form of cutter supporting head particularly suitable for outside turning operations in which roughing and finishing cuts may be taken with the same cutter without requiring resetting of the same. As herein shown, the head comprises a generally cylindrical hub member 50 having a central bore 51 fitted with a liner or bushing 52 adapted to receive the pilot 14 of the driver. Integral with the hub and projecting radially from one side thereof is a rigid arm 53 adapted to carry a cutter 54 of any suitable character. The cutter preferably is rigidly clamped by set screws 55 in a T-shaped holder having its narrow end portion slidably disposed in a slot 57 extending longitudinally of the arm 53 and radial with respect to the central axis of the hub member 50. The holder 56 is adapted to be moved along said slot and locked in any selected position therein by means of a locking screw 58 threaded into the holder and bearing against a washer 59 engaging the arm 53 on opposite sides of the slot 57.

Keyways 60 and 61 are provided in the rear face of the member 50 for cooperation with the key 17 of the driver, whereby the arm 53 may be set in either of two angular positions with respect to the axis of the driver. As will be seen by reference to Fig. 9, the keyway 60 is disposed at an angle X to a radical plane intersecting the cutter 54 and the axis about which said member is adapted to be rocked. The keyway 61 is disposed at a substantially larger angle Y to said plane. Alinement of the keyways with the key 17 is therefore effective to locate the outer end of the arm 53 at different distances from the point of maximum eccentricity of the driver pilot 14, thereby varying the spacing of the cutter 54 from the rotational axis of the driver and correspondingly varying the diameter of the cutting path described by the cutter. In the particular tool illustrated, the key 17 is adapted to be engaged in the keyway 60 for rough turning and in the keyway 61 for finish turning, the latter setting resulting in a small adjustment of the cutter toward the axis of the driver whereby additional stock may be removed from the work.

It will be apparent from the foregoing that the invention provides a metal working tool of novel and improved construction. By providing a relatively adjustable cutter head and driver, the relative spacing of a cutter from the axis of the driver may be quickly and accurately adjusted without requiring a resetting of the cutter. Moreover, the head may be arranged to carry a plurality of cutters which may be conditioned for operation singly and selectively by a simple adjustment of the head with respect to the driver. Such adjustments are simplified by the provision of coacting means on the driver and the head for accurately locating the latter in selected positions of adjustment and for preventing relative movements of the parts from such adjusted position. In general, the improved tool is simple and rugged in construction and relatively inexpensive to manufacture. It is highly efficient in operation and greatly facilitates the performance of successive machining operations upon work pieces.

I claim as my invention:

1. A metal working tool comprising, in combination, an elongated driver adapted to be secured to the rotatably driven spindle of a machine tool for rotation therewith about a longitudinal axis, a cylindrical pilot at one end of said driver having its axis parallel to the rotational axis of the driver but offset laterally relative thereto, a head having a centrally disposed opening adapted to receive said pilot, means on said head for supporting a plurality of radially projecting cutters circumferentially spaced apart around the head, said head being adjustable by rotation upon said pilot to select one of said cutters and to locate the selected cutter in a position to describe a circle of revolution of greater diameter than the circles of revolution described by the other cutters upon rotation of said driver, and means for rigidly locking said head in adjusted position.

2. A metal working tool comprising, in combination, a driver adapted to be secured to the rotatably driven spindle of a machine tool for rotation therewith, a pilot rigid with said driver having its axis disposed parallel to the rotational axis of the driver but offset laterally therefrom, a head having a centrally disposed opening for the reception of said pilot, means on said head for supporting a plurality of radially projecting cutters uniformly spaced apart circumferentially of the head, said head being rotatable about the axis of said pilot to select any one of said cutters and to condition the selected cutters for operation by positioning it in alinement with the axes of said pilot and said driver, a key rigid with said driver, and a plurality of keyways in said head adapted to receive said key, each of said keyways being located so as to hold said head in a position for conditioning one of said cutters for operation.

3. A metal working tool comprising, in combination, an elongated driver adapted to be attached to a rotatably driven machine tool spindle for rotation therewith about a longitudinal axis, a generally cylindrical pilot at one end of said driver having its central axis parallel to the rotational axis of the driver and offset laterally therefrom, an annular head having a central opening adapted to fit over said pilot, a plurality of radially disposed cutter receiving slots formed in one face of said head, recesses in said one face of said head spaced from said slots and defining exposed walls of substantially uniform width at one side of each recess, said walls being apertured for the reception of threaded clamping screws adapted to extend transversely into said slots to rigidly clamp a cutter therein, and cooperating means on said driver and the other face of said head for positioning the head to aline any selected cutter slot with the axes of said pilot and said driver whereby to select and position one of the cutters for operation.

GEORGE WEST.

REFERENCES CITED

The following references are of record in the file of this patent:

UNITED STATES PATENTS

| Number | Name | Date |
|---|---|---|
| 740,047 | Schade et al. | Sept. 29, 1903 |
| 2,211,321 | Eipper | Aug. 13, 1940 |
| 1,135,329 | Shearer | Apr. 13, 1915 |
| 1,341,565 | Krepps | May 25, 1920 |
| 1,414,337 | Brown | May 2, 1922 |
| 1,361,198 | Strand | Dec. 7, 1920 |
| 1,977,791 | Barrett | Oct. 23, 1934 |